(12) United States Patent
Perez

(10) Patent No.: US 7,109,701 B2
(45) Date of Patent: Sep. 19, 2006

(54) METHOD FOR TESTING MAGNETIC HARD DISK OR MAGNETIC HEAD

(75) Inventor: John Perez, Fujisawa (JP)

(73) Assignee: International Manufacturing and Engineering Services Co., Ltd., Kanagawa-ken (JP)

(*) Notice: Subject to any disclaimer, the term of this patent is extended or adjusted under 35 U.S.C. 154(b) by 320 days.

(21) Appl. No.: 10/661,751

(22) Filed: Sep. 12, 2003

(65) Prior Publication Data
US 2005/0248868 A1   Nov. 10, 2005

(30) Foreign Application Priority Data
Sep. 13, 2002   (JP)   ............................. 2002-267980

(51) Int. Cl.
   *G01R 33/12* (2006.01)
(52) U.S. Cl. ...................................... 324/210; 324/212
(58) Field of Classification Search ................ 324/210, 324/212
   See application file for complete search history.

(56) References Cited

U.S. PATENT DOCUMENTS

| 4,638,384 A | * | 1/1987 | Stewart et al. ........... 360/77.05 |
| 6,023,145 A |   | 2/2000 | Karaaslan et al. .......... 318/652 |
| 6,696,831 B1 |  | 2/2004 | Nozu ......................... 324/210 |

* cited by examiner

*Primary Examiner*—Reena Aurora
(74) *Attorney, Agent, or Firm*—McCormick, Paulding & Huber LLP

(57) ABSTRACT

A testing method for a magnetic hard disk or a magnetic head in a test system includes a moving step in which the magnetic head, which moves to fly closely over the magnetic disk, moves to a predetermined radial position corresponding to the position data of the magnetic disk which rotates at a predetermined constant speed; a reading step in which imbedded position data is read out for each sector of the magnetic disk is by the magnetic head; and a reading/writing step in which a predetermined signal is written in or read out from a data area of the sector by the magnetic head when the position data is one of equal to a predetermined value and within a predetermined range.

3 Claims, 7 Drawing Sheets

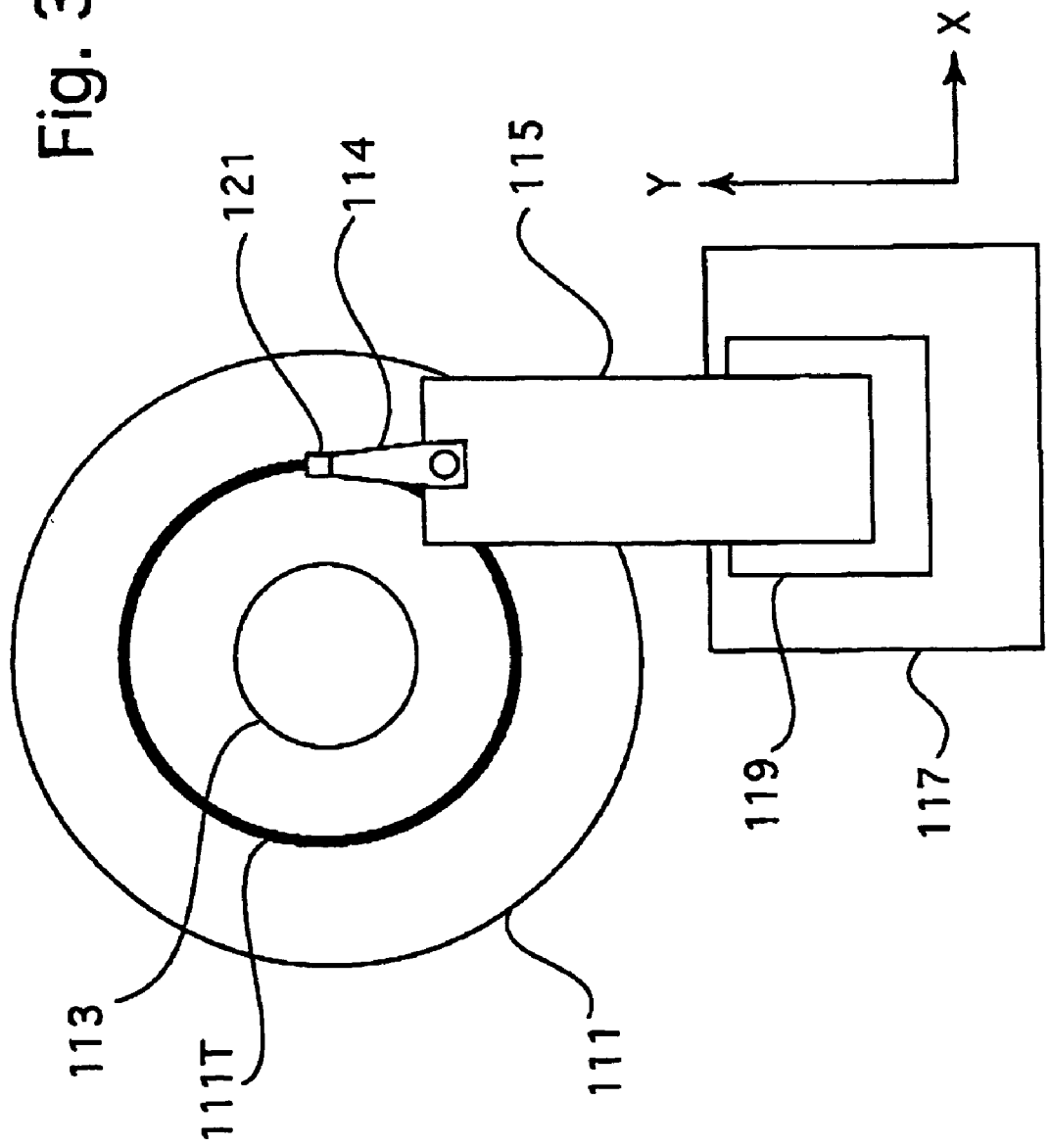

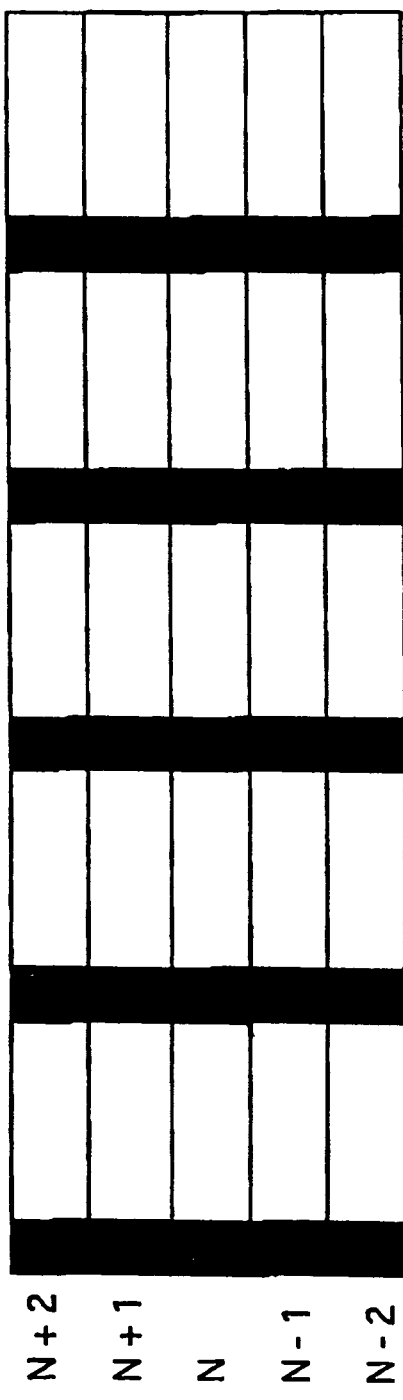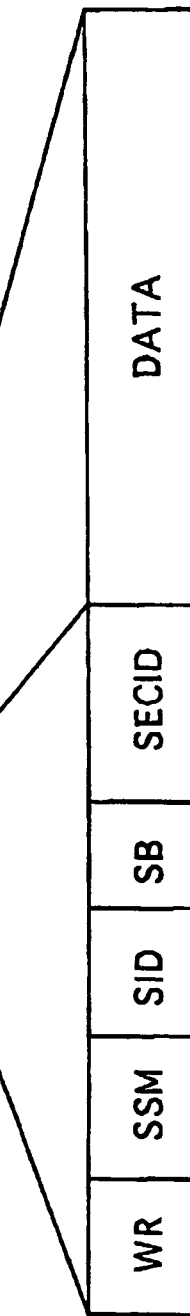
Fig. 4A
Fig. 4B

Fig. 5

| | Reading Signal | WR | SSM | SID | A | B | C | D | SECID | Data Area |
|---|---|---|---|---|---|---|---|---|---|---|
| 1 | | | | | | | | | | |
| 2 | Search SSM | ■ | | | | | | | | |
| 3 | SSM Detected | | ■ | | | | | | | |
| 4 | SSM Clocking | | ■ | | | | | | | |
| 5 | Read SID | | | ■ | | | | | | |
| 6 | Burst-A- Time | | | | ■ | | | | | |
| 7 | Burst-B- Time | | | | | ■ | | | | |
| 8 | Burst-C- Time | | | | | | ■ | | | |
| 9 | Burst-D- Time | | | | | | | ■ | | |
| 10 | Generate PS<br>PS:Position Signal | | | | | | | | ■ | |
| 11 | Read SECID | | | | | | | | ■ | |
| 12 | Process DATA<br>(Read or Write) | | | | | | | | | ■ |

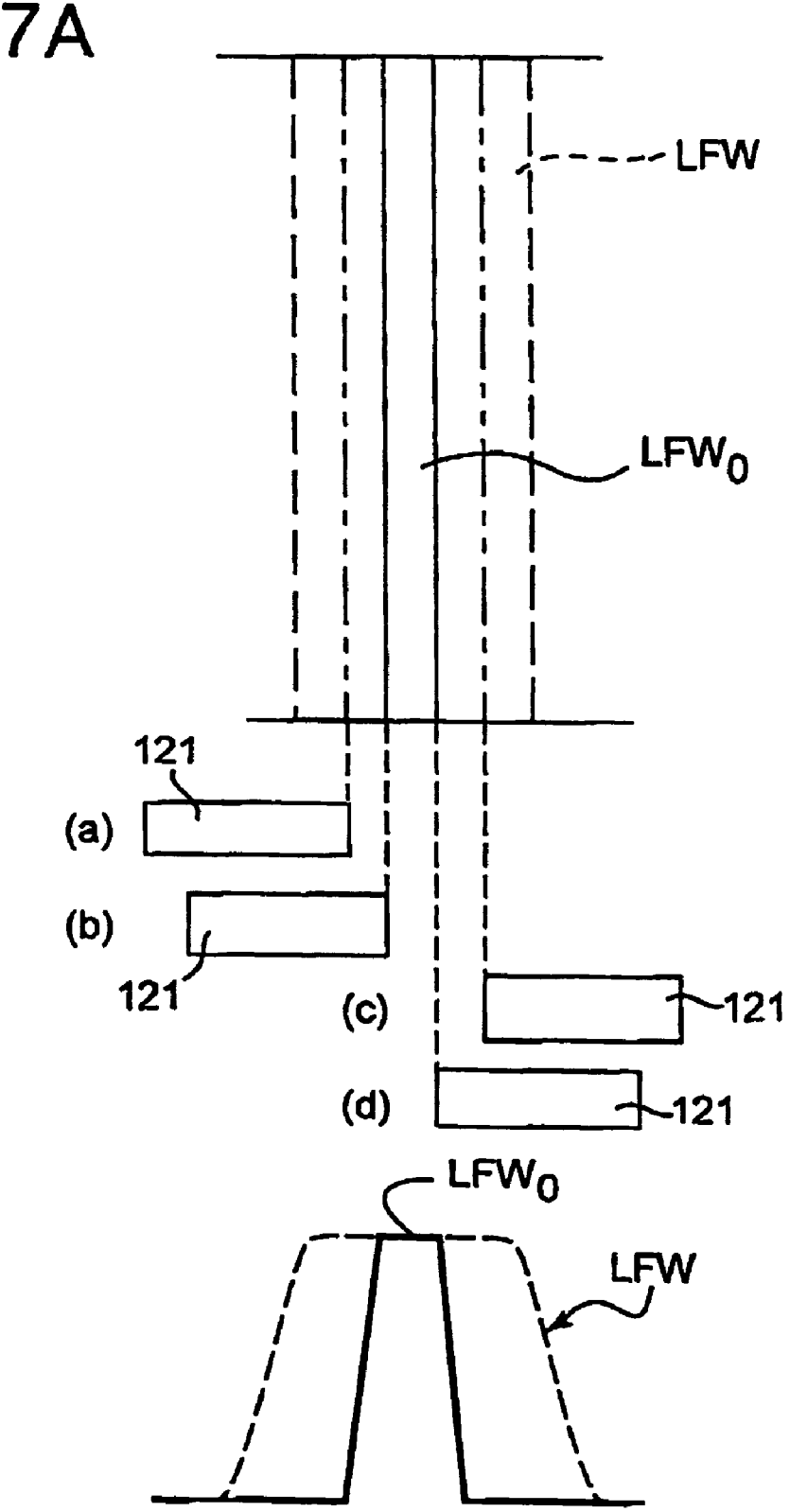

METHOD FOR TESTING MAGNETIC HARD DISK OR MAGNETIC HEAD

CROSS-REFERENCE TO RELATED APPLICATIONS

This application is entitled to the benefit of and incorporates by reference essential subject matter disclosed in Japanese Patent Application No. 2002-267980 filed on Sep. 13, 2002 in the name of International Manufacturing and Engineering Services Co., Ltd.

BACKGROUND OF THE INVENTION

1. Field of the Invention

The present invention relates to a testing method for a magnetic hard disk or a magnetic head, which is a significant functional part of a magnetic hard disk drive or a magnetic hard disk storage device (which will be referred to hereinafter as an HDD).

2. Description of the Related Art

An HDD is a mass storage random access memory device in which digital data is written in or read from a magnetic hard disk medium (platter) which rotates at high speed by a magnetic head which is located above and close to the magnetic disk medium. In recent years, HDDs have been miniaturized in accordance with developments in an information-oriented society and as a result of technological competition. Accordingly, for the same shape and size of HDD, the storage capacity has been dramatically increased. The increase in the storage capacity for the same shape and size can be achieved by increasing the density of magnetic recording of the magnetic disk medium.

The magnetic recording density (surface density: unit: GbpSI (bit per square inch)) is the product of the linear density (density in the circumferential direction: unit: bpi (bit per inch)) and the track density (density in the radial direction: unit: TPI (track per inch)). The magnetic recording density of a typical HDD at present is approximately 54 GbpSI (=600 k bpi (linear density)×90 k TPI (track density). However, the target recording density at the moment is 100 GbpSI, and it is expected that the recording density will be increased to approximately 1000 GbpSI in the near future. In so-called horizontal magnetic recording technology at present, the linear density is reaching its limit due to self-demagnetization, and the like. Therefore, attempts have been made to increase the track density. For example, if the track density of 90 k TPI is increased to the value of the linear density, i.e., approximately 600 k TPI, the surface density would be increased 7 times, i.e., to approximately 360 GbpSI.

A head tester to test the HDD heads whose magnetic recording density has been considerably increased includes a mechanical device referred to as a spinstand which approximates the magnetic head to be tested to a state of use in the HDD and which has a magnetic hard disk, an air spindle motor to rotate the magnetic hard disk, a positioning mechanism which holds and moves the magnetic head to a predetermined track, and an analyzer which generates, records and tests signal waves.

However, the technical level of the magnetic head testers which have been used in practice does not satisfactorily meet the improved performance of the HDD products or their parts. This is because, firstly, it is difficult to improve the read/write signal frequency, and secondly, it is difficult to enhance the accuracy in magnetic head positioning in the radial direction, with respect to the tracks, in a head measurement technology for a very small track width.

The HDD as a product employs embedded servo technology (sector servo technology) to obtain the head positioning accuracy (in the radial direction) necessary to measure the head for tracks of a very small width, whereas, in the spinstand of the magnetic head tester, sector servo technology is not employed. Instead, the mechanical precision of the mechanical elements of the spinstand is enhanced, and the mechanical vibration is suppressed in order to achieve the positioning accuracy as accurate as what sector servo technology can provide. However, the improvement of the positioning accuracy which meets the track density which has been increased year by year is reaching its limit.

The relationship of the track density, the track pitch, the head track width, and required positioning repeatability is shown below.

| Track Density | 50K TPI | 200K TPI | 500K TPI |
|---|---|---|---|
| Track Pitch | 500 nm | 125 nm | 50 nm |
| Head Track Width | 300 nm | 75 nm | 30 nm |
| Required Positioning Repeatability | 30 nm | 7.5 nm | 3 nm |

The main reasons of the positional deviation (positioning error) of the magnetic head are:

(1-1) Acyclic deviation of the spindle motor (NRRO).

(1-2) Positional deviation of the magnetic head holding mechanism and the magnetic head due to vibration, etc.

(1-3) Vibration of the magnetic hard disk and the magnetic head due to the turbulence of the air flow above the magnetic disk which rotates at high speed.

In conventional magnetic head testers, attempts have been made to enhance the positioning accuracy by combining a damping bed, an air-bearing spindle motor, a piezo actuator, and an air flow regulator (straightening vane), etc. In this solution, the cost and the required accommodation space are increased as the requirements of the accuracy are increased. Moreover, there is a limit of enhancement of the accuracy. The highest track recording density obtained by the conventional solution is approximately 50 kTPI. Furthermore, the measurement accuracy becomes worse as the track recording density reaches its limit.

It is possible to apply sector servo technology, which is employed in HDD products themselves, to a following control (tracking control), although it has not been used in practice in the head tester. In sector servo technology, the track position data is written in advance with high precision on the magnetic disk in a designated format, and the written data is read every moment, by the test magnetic head to correct the positional deviation (following control) to thereby achieve high precision positioning.

Accordingly, the following must be achieved:

(2-1) An accurate track position data writing function (servo track writing function): and (2-2) An actuator with high rigidity for high speed following.

To meet these requirements, the spinstand must be provided with a high precision servo track writing function. It is possible to incorporate an accurate air-bearing spindle motor in the spinstand. However, since an attachment and detachment mechanism of the test magnetic head is necessary, an arm front end portion becomes heavy, and thus, it is difficult to increase the tracking speed. Due to these restrictions, the maximum value obtained by the following control using the sector servo technology is approximately 200 k. TPI.

SUMMARY OF THE INVENTION

The present invention provides a testing method for a magnetic hard disk or magnetic head in which the measurement precision can be enhanced without increasing the mechanical accuracy.

The present invention has been achieved in view of the fact that high speed track seeking are required in a test of a magnetic hard disk or a magnetic head, unlike a test of a product such as an HDD.

According to an aspect of the present invention, a testing method for a magnetic hard disk or a magnetic head in a test system is provided, including a moving step in which the magnetic head, which moves to fly closely over the magnetic disk, moves to a predetermined radial position corresponding to the position data of the magnetic disk which rotates at a predetermined constant speed; a reading step in which the imbedded position data is read out for each sector of the magnetic disk is by the magnetic head; and a reading/writing step in which a predetermined signal is written in or read from a data area of the sector by the magnetic head when the position data is one of equal to a predetermined value and within a predetermined range.

With this testing method, since the data reading or writing operation is carried out only when the magnetic head is located at a predetermined position or within a predetermined allowable position range, the data can be read or written at a correct position with at high precision exceeding the positioning or tracking precision of the magnetic head.

In another embodiment, a testing method for a magnetic hard disk or a magnetic head in a test system is provided, including a moving step in which the magnetic head moves to fly closely over the magnetic disk to a predetermined radial position corresponding to a position data of the magnetic disk which rotates at a predetermined constant speed; a writing step wherein for each sector of at least one track, imbedded position data is read out, a predetermined signal is written in a data area of the sector immediately thereafter, and the read position data is stored, the writing step being performed for at least one rotation of the magnetic disk; a first reading step in which the imbedded position data is read out from each sector of the track by the magnetic head and data of the data area of the sector is read out and stored, when the read position data is one of equal to the stored position data corresponding to the sector data and a difference therebetween is within an allowable range, the data reading and storing operations being performed for at least one rotation of the magnetic disk; a data overwriting step in which the imbedded position data is read out from each sector of the track by the magnetic head and another signal is written in the data area of the sector, when the read position data and the stored position data corresponding to the sector data are one of the same as each other and a difference therebetween is within an allowable range, the data reading and writing operations being performed for at least one rotation of the magnetic disk; and a second reading step in which the overwritten position data is read out from each sector of the track by the magnetic head and the data of the data area of the sector is read out, when the read position data and the stored position data corresponding to the sector data are one of the same as each other and a difference therebetween is within an allowable range.

The testing method can further include an erasing step which is performed between the moving step and the writing step, wherein a data area is erased only for each sector having a specified band area centered at the target track position.

It is desirable for the predetermined signal to be written at a low frequency during the data writing step and the another signal is overwritten at a high frequency during the overwriting step.

In another embodiment, a testing method for a magnetic hard disk or a magnetic head in a test system is provided, including a moving step in which the magnetic head moves to fly closely over the magnetic disk to a predetermined radial position corresponding to a position data of the magnetic disk which rotates at a predetermined constant speed; a data writing step in which imbedded position data is read out for each sector of at least one track, wherein when the read position data is one of equal to a predetermined target position data corresponding to the sector data and a difference therebetween is within an allowable range, a predetermined signal is written in a data area of the sector, the writing step being performed for at least one rotation of the magnetic disk; a first reading step in which the imbedded position data is read out from each sector of the track by the magnetic head and data of the data area of the sector is read out, when the read position data is one of equal to the predetermined target position data corresponding to the sector data and a difference therebetween is within an allowable range, the data reading and storing operations being performed for at least one rotation of the magnetic disk; a data overwriting step in which the imbedded position data is read out from each sector of the track by the magnetic head and another signal is written in the data area of the sector, when the read position data and the predetermined target position data corresponding to the sector data are one of the same as each other and a difference therebetween is within an allowable range, the data reading and writing operations being performed for at least one rotation of the magnetic disk; and a second reading step in which the overwritten position data is read out from each sector of the track by the magnetic head and the data of the data area of the sector is read out, when the read position data and the predetermined target position data corresponding to the sector data corresponding to the sector data are one of the same as each other and a difference therebetween is within an allowable range.

It is desirable for the predetermined signal to be written at a low frequency during the data writing step and the another signal is overwritten at a high frequency during the overwriting step.

In another embodiment, a read/write method for a magnetic hard disk and a magnetic head in a test system is provided, including a moving step in which the magnetic head moves to fly closely over the magnetic disk to a predetermined track of the magnetic disk; a data reading and writing step wherein for each sector of at least one track, imbedded position data is read out, and a predetermined signal is written in a data area of the sector immediately thereafter, and the read position data is stored; and a reading step in which the imbedded position data is read out from each sector of the track by the magnetic head and data of the data area of the sector is read out and stored, when the read position data is one of equal to the stored position data corresponding to the sector data and a difference therebetween is within an allowable range, the data reading and storing operations being performed for at least one rotation of the magnetic disk.

The read/write method can further include a data overwriting step in which the imbedded position data is read out from each sector of the track by the magnetic head and another signal is written in the data area of the sector, when the read position data and the stored position data corresponding to the sector data are one of the same as each other and a difference therebetween is within an allowable range, the data reading and writing operations being performed for at least one rotation of the magnetic disk.

The read/write method can further include a second reading step in which the overwritten position data is read out from each sector of the track by the magnetic head and data of the data area of the sector is read out, when the read position data and the stored position data corresponding to the sector data are one of the same as each other and a difference therebetween is within an allowable range.

It is desirable for the predetermined signal to be written at a low frequency during the data writing step.

The another signal can be overwritten at a high frequency during the overwriting step.

In another embodiment, a side erase method for a magnetic hard disk and a magnetic head in a test system is provided, including a first moving step in which the magnetic head moves to fly closely over the magnetic disk to a predetermined radial position corresponding to a position data of the magnetic disk which rotates at a predetermined constant speed; a writing step in which imbedded position data is read out for each sector of at least one track, wherein when the read position data is one of equal to a predetermined target position data corresponding to the sector data and a difference therebetween is within an allowable range, a predetermined signal is written in a data area of the sector, the writing step being performed for at least one rotation of the magnetic disk; a second moving step in which the magnetic head moves to one of plural target positions that are located on the outer circumference side of the reference position and one of plural target positions that are located on the inner circumference side of the reference position; and an erasing step in which the data of the data area of the sector is erased when the read position data is the same as a predetermined value or is within a predetermined range only on the sector of which the position data read in the target position.

In another embodiment, a testing method for a magnetic hard disk or a magnetic head in a test system is provided, including a moving step in which the magnetic head moves to fly closely over the magnetic disk to a predetermined radial position corresponding to a position data of the magnetic disk which rotates at a predetermined constant speed; a data writing step in which a predetermined encoded digital data is written on the data area of each sector while the sectors imbedded position data is read out and stored, the writing step being performed for at least one rotation of the magnetic disk; a reading step in which the encoded data of each sector is read out for data error detection when the read position data of that sector is one of equal to the stored position data at the writing step and a difference therebetween is within an allowable range, the reading step being performed for at least one rotation of the magnetic disk.

It is desirable for the reading step to be performed for all or selected sectors while imbedded position data for the corresponding sectors are read out and stored, the reading step being performed for at least one rotation of the magnetic disk, the reading step being followed by a data error calculation process using one of the stored position data for valid sector selection and bathtub curve measurement.

In another embodiment, a test system for testing a magnetic hard disk or a magnetic head in a test system is provided, including a magnetic hard disk in which imbedded position data is formatted for each sector of tracks thereof, and which rotates at a predetermined constant rotation speed; a magnetic head; a magnetic head moving mechanism which holds the magnetic head and which moves the magnetic head to a predetermined position in a radial direction of the magnetic disk, the magnetic head flying closely over the magnetic disk; and a movement control device for driving the magnetic head moving mechanism and moving the magnetic head moving mechanism to a predetermined radial position corresponding to the position data. The imbedded position data for each sector of the magnetic disk is read, and a predetermined signal is one of written in and read out from a data area of the sector, when the position data is one of equal to a predetermined value and within a predetermined range.

The present disclosure relates to subject matter contained in Japanese Patent Application No. 2002-267980 (filed on Sep. 13, 2002) which is expressly incorporated herein in its entirety.

BRIEF DESCRIPTION OF THE DRAWINGS

The invention will be discussed below with reference to the accompanying drawings, of which:

FIG. 3 is a schematic view of a spinstand in a test system shown in FIG. 1;

FIGS. 4A and 4B are views of an example of a format of a magnetic hard disk;

FIG. 5 is a timing chart for reading sectors of a magnetic hard disk;

FIG. 7A schematically shows a track overview for a side erasing process in a testing method of the present invention; and FIG. 7B schematically shows a micro track profile for a side erasing process in a testing method of the present invention.

DESCRIPTION OF THE PREFERRED EMBODIMENT

Figure 1:
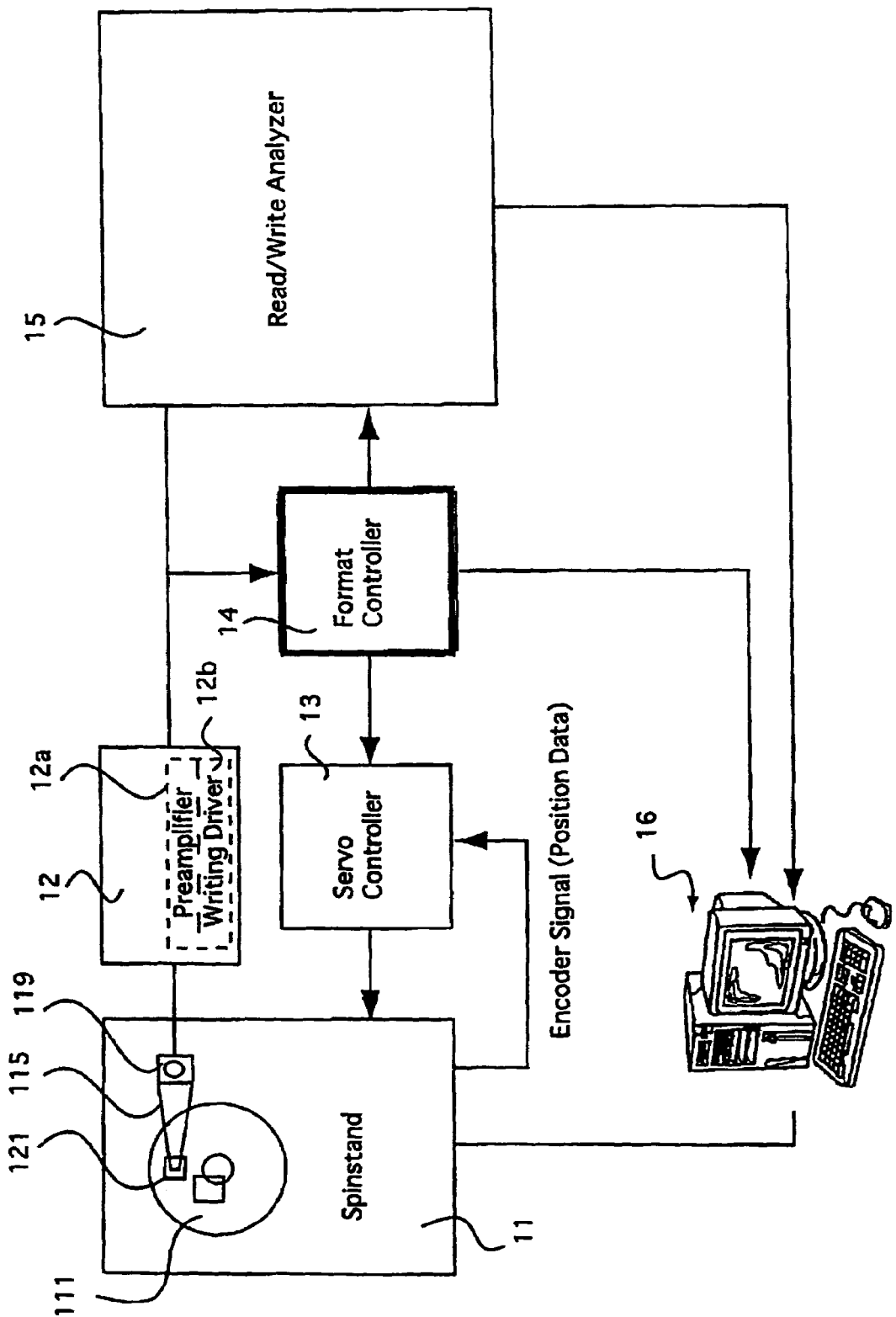
FIG. 1 is block diagram of a test system for carrying out a testing method for a magnetic head for a magnetic hard disk drive, according to an embodiment of the invention.

A typical servo track format of a data surface of a magnetic hard disk of an HDD to which the present invention is applied will be explained with reference to FIGS. 4 and 5.

The following magnetic head positioning method is adopted for the HDD. Upon completion of the assembly of the magnetic hard disk, the magnetic head, etc., in the HDD manufacturing process, electricity is supplied. After the basic function of each element is confirmed, servo-track writing is carried out to write position data (servo data), which is data embedding position data, on all the tracks of the data surfaces of each magnetic disk (in general, a plurality of magnetic disks), using a servo-track writer. One track is divided into several tens or hundreds of servo sectors. One servo sector is provided with a servo area at its leading end and the remaining areas define data areas which are used to record and reproduce the data. The division of the servo sectors is generally referred to as a track format or a sector format. A typical track format is shown in FIGS. 4A and 4B.

In FIG. 4A, the circular tracks formed on the magnetic disk and the arched sector format are schematically developed in linear tracks in the horizontal direction. If the magnetic head is positioned over track N, the signals on track N is read from left to right. FIG. 4B shows a detailed view of the divided areas of one servo sector. Each servo sector includes the servo area and the data area. The servo area includes the following small areas.

WR (Write Recovery Field): Area which provides a preparation time from the writing mode to the servo area reading when data is written SSM (Servo Start Mark): Marker area which indicates the beginning end of the servo area SID (Servo Identification Field): Area in which the track number or cylinder number is recorded SB (Servo Burst Field): Area in which analogue position signals (data embedding surface position data) are recorded SECID (Sector Identification Field): Area in which the sector number is recorded DATA (Data Field): Area in which the user data is recorded (data area of the sector)

In the track/cylinder number area SID, data is written in a number expressing method called a gray code, so that the data can be correctly read during the movement of the magnetic head in the disk radial direction (upward and downward direction in FIG. 4A). In the analogue position signal area SB, data can be written using various methods, however, it is predominant for the analogue position signal area SB to be divided into four time areas in which data is written with a phase difference in the radial direction, so that two-phase analogue position data is obtained based on four amplitude data. This system generates two phase signals like that in an optical position encoder. A positional difference with respect to a reference track position in the radial direction can be obtained by measuring the amplitude of the two-phase signal. In the illustrated embodiment, the position data of the magnetic head, i.e., the track of the magnetic disk, the absolute position data in the radial direction and the sectors are obtained by combining data read from the track/cylinder number area SID, the analogue position signal area SB and the sector number area SECID by the magnetic head. Note that if the tracks to be traced are identical, the relative positional data with respect to the track and the absolute position in the radial direction can be obtained as position data based only on the analogue position signal area SB and the sector data.

A magnetic head 121 flying above the magnetic disk 111 which rotates is position-controlled in accordance with the position data of the read servo area data, while continuously reading the servo area data written in the track format. The head positioning control includes a seeking operation to move the magnetic head to a target track and a track tracing operation to subsequently trace the track. The control in which the data is read from and written in the data area, while reading the servo area data is referred to as a "format control" which is carried out by a format controller.

The test system and test method according to the present invention to test (measure) the magnetic head or magnetic disk for the HDD will be discussed below with reference to the drawings. In the spinstand (magnetic head moving mechanism) 11, a high precision magnetic head moving mechanism includes an X-Y moving mechanism, a lock mechanism, and a piezo actuator fine movement mechanism with a sensor, in combination. However, in the present invention, the structure of the spinstand is not limited to any specific spinstand, and hence, the spinstand includes a spindle, a head attachment and detachment mechanism, and a head fine movement mechanism, as shown in FIG. 3, by way of example.

A spinstand 11 is provided with a magnetic disk (magnetic disk medium, platter) 111, an air-bearing spindle motor 113 (see FIG. 3) for rotating the magnetic disk 111, a magnetic head 121, a suspension 114, a fixture 115 serving as a magnetic head holding mechanism, a piezo actuator 119 serving as an X-axis fine positioning mechanism and mounted on an X-Y table 117, the X-Y table 117 serving as a course positioning mechanism.

The magnetic head 121 is positioned by the X-Y table 117 and the piezo actuator 119 to simulate an HDD's swing arm or rotary actuator movement.

In the illustrated embodiment, the actuator 119 is driven by a computer, e.g., a personal computer (movement control device) 16 to move the magnetic head 121 in a designated radial direction at a predetermined pitch. Moreover, a magnetic head, such as a GMR (Giant Magneto-Resistive) head, which is currently the most predominantly used magnetic head, is provided with independent read and write heads. The test magnetic head 121 in the illustrated embodiment is a GMR head having the independent read and write heads.

As shown in FIG. 1, an FEE (Front-end Electronics) 12 is provided with a preamplifier 12a and a write driver 12b and constitutes an electric interface which reads and writes data on the magnetic disk 111 by the magnetic head 121.

The preamplifier 12a amplifies the micro signal output from the magnetic head (read head) 121 which reads the data from the magnetic disk 111. The amplified read signal is supplied to a format controller 14 and a read/write analyzer (read/write control device) 15. The write driver 12b forms an amplifier which amplifies the data signal to write the data signal output from the read/write analyzer 15 on the magnetic disk 111 by the magnetic head (write head) 121. The FEE 12 which processes the micro signal or high-speed signal must be located as close to the magnetic head as possible. To this end, in general, the FEE 12 is located within the spinstand 11. Note that the FEE which is formed integral with the magnetic head is used in the illustrated embodiment.

A servo controller 13 controls the position of the magnetic head 121 on the spinstand 11. There are two pieces of position data to be referenced, i.e., position data output from the head positioning mechanism in the spinstand 11 (position data of the magnetic head 121 in the radial direction), and position data imbedded in the data surface (PS: position signal) read from the magnetic disk 111 via the format controller 14.

The format controller 14 extracts position data from the signals read by the magnetic head 121 and supplies the same to the servo controller 13 and supplies the read/write timing signal for the data area to the read/write analyzer 15.

The timing chart of the format controller 14 to read the data in one sector is shown in FIG. 5 by way of example.

The format controller 14 has a function to record the data of the position of the magnetic head when the data is written on or read from the magnetic disk 111 by the magnetic head 121 and to send the recorded position data to the personal computer 16.

The read/write analyzer 15 performs the signal processing necessary for the function test of the magnetic head 121, such as writing the data on the magnetic disk 111 through the FEE 12 and the magnetic head 121 in response to the command of the personal computer 16, and reading the written data from the magnetic disk 111, etc. The writing and reading of data are carried out in synchronization with the timing signal output from the format controller 14.

The personal computer 16 controls the spinstand 11, the read/write analyzer 15, and the format controller 14 in accordance with the operation of an operator and performs a function test of the magnetic head 121, the host reporting or the servo track (the position data) writing, etc.

Figure 2:
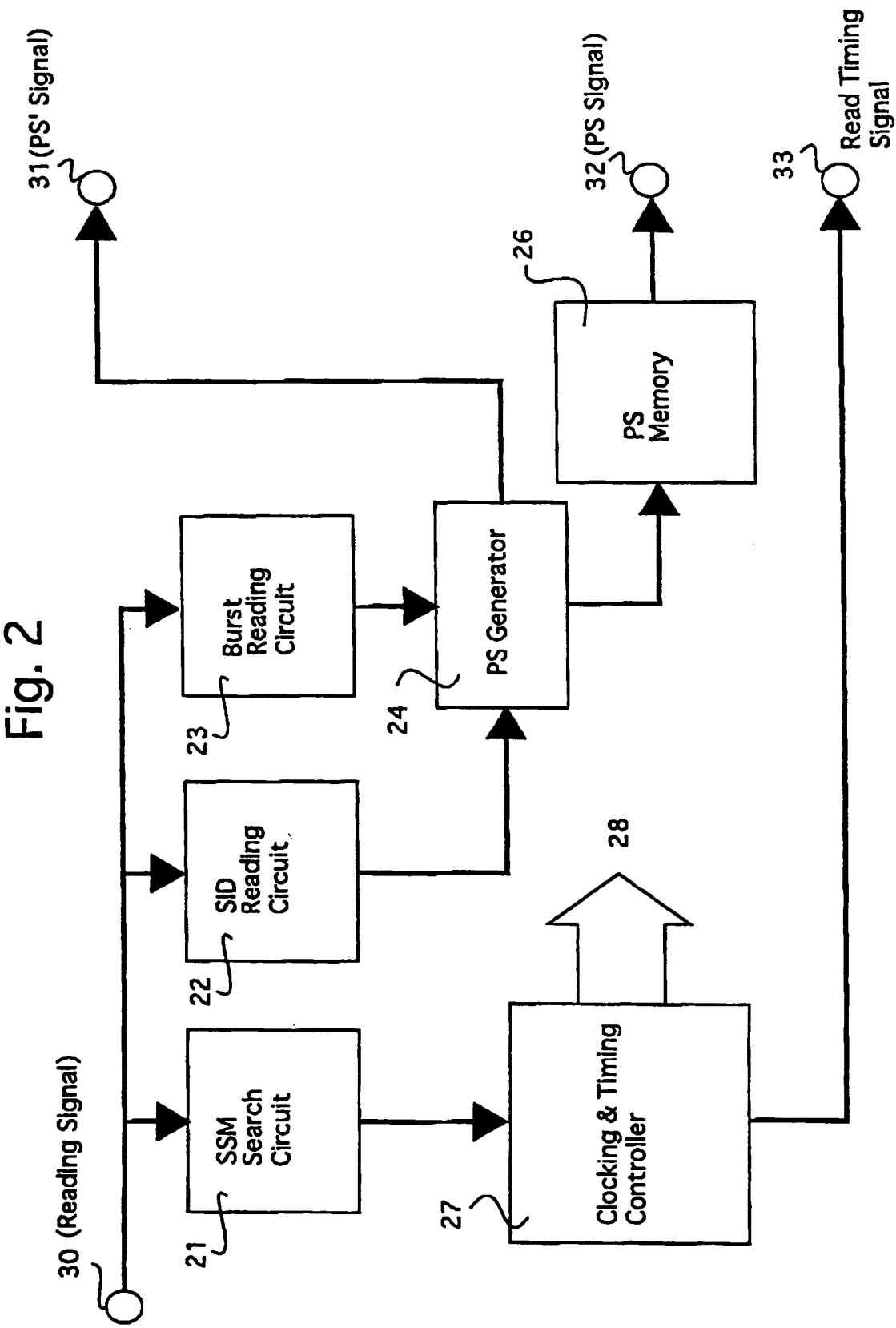
FIG. 2 is a block diagram of an embodiment of main components of a format controller in a test system shown in FIG. 1.

The details of the format controller 14 in the illustrated embodiment will be discussed below with reference to a block diagram shown in FIG. 2. In FIG. 2, a read signal 30 is obtained by amplifying the read signal output from the magnetic head 121 by the pre-amplifier 12a. The amplified read signal is input to each detection block.

A PS' signal 31 represents analogue or digital position data, output from a PS generator 24 and supplied to the servo controller 13.

A PS signal 32 represents digital position data read from a PS memory 26 and supplied to the personal computer 16.

A read/write timing signal 33 represents timing data output from a clocking & timing controller 27 and supplied to the read/write analyzer 15.

An SSM search circuit 21 (Search SSM) detects the data pattern of the marker area SSM and supplies the detected data pattern to the clocking & timing controller 27.

An SID reading circuit 22 (Read SID) separates data of the track/cylinder number area SID and supplies separated track/cylinder number data to the PS generator 24.

A burst reading circuit 23 (Read Burst) generates a two-phase analogue position signal from the signal of the analogue position signal area SB of the read signal 30 and supplies the two-phase analogue position signal to the PS generator 24.

The PS generator 24 generates position data, based on the data of the track/cylinder number area SID and the analogue position signal area SB.

The PS memory 26 stores the position signal for one turn of the magnetic disk as the position signal PS and supplies the stored position signal to the personal computer 16 as the PS position signal 32, in response to a command of the personal computer.

The clocking & timing controller 27 generates a control timing (system timing) signal 28 and the read/write timing signal 33 in the format controller 14, in accordance with an SSM detection timing signal from the SSM search circuit 21 and the read signal 30.

The SSM search circuit 21, the SID reading circuit 22, the burst reading circuit 23, the timing clock controller 27 are controlled by hardware (electronic circuits). The PS generator 24 and the PS memory 26 are controlled by software, i.e., by a microprocessor (such as a digital signal processor (DSP)) and predetermined micro-programs.

The function of the format controller 14 and the entire test method is explained hereafter.

The functions of the format controller 14 are as follows.

To extract the sector timing from the read signal and supply the read/write timing signal to the read/write analyzer 15.

To extract the track position data from the read signal and supply the track position to the servo controller 13.

To read the position data (positional deviation data) of the magnetic head from the hard disk for each sector and record the position data as a PS position signal for each sector, transfer the position data to the personal computer 16, and compare the read position data with the position data of the sector read from the personal computer 16.

To provide a high track density (unit: TPI (Track per Inch)) in the HDD, it is necessary to use a magnetic head for a small track width. To read data written on the small-width track, it is necessary to highly accurately position the magnetic head. Recent magnetic heads have an independent read head and write head. When the characteristics of the magnetic head is measured, in general, the data is written using the test magnetic head itself (self-writing), and the data is thereafter read by the magnetic head to be analyzed.

In a GMR head, whose read and write elements are formed separately, the read and write elements have a radial positional offset, called a read/write offset, due to design and/or manufacturing process reasons. This read/write offset should be precisely measured in the test system before functional testing.

An embodiment of the invention can be advantageously applied to a test method for precisely measuring the read/write offset and the read/write characteristics of the magnetic head.

In a test method of a magnetic head, a more accurate measurement, such as a track profile test, can be carried out by the use of a spinstand of a conventional mechanical precision. The significant features of the test method of the present invention are as follows:

No tracking control (following control or trace control) of the magnetic head 121 based on the PS' position data is carried out.

The reading or writing operation is carried out based on the PS' position data at each moment of reading or writing of data onto the magnetic disk 111 by the magnetic head 121 and the stored PS position data only when predetermined PS' position data is obtained.

In the present invention, it is also possible to perform the operation (b) mentioned above while carrying out the tracking control of the magnetic head.

Figure 6A:
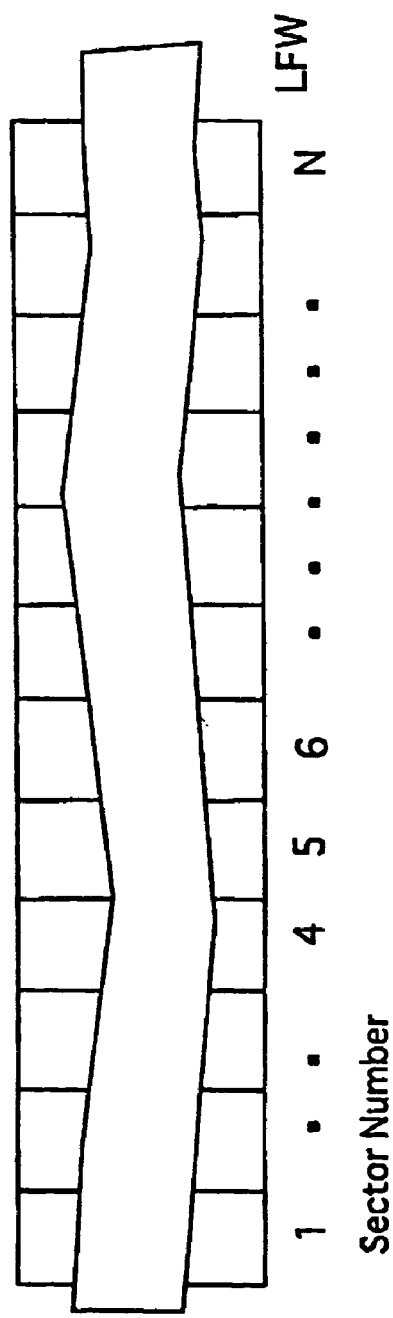
FIG. 6A schematically shows tracing tracks of a magnetic head, which represent writing and reading states in a test method of the present invention, in which the arc-shaped track is linearly developed, when data is written.
Figure 6B:
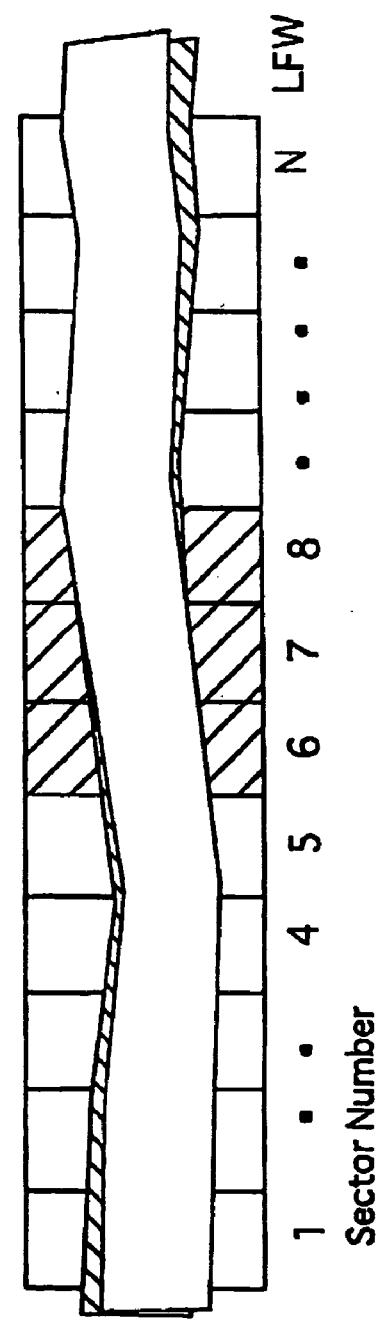
FIG. 6B schematically shows tracing tracks of a magnetic head, which represent writing and reading states in a test method of the present invention, in which the arc-shaped track is linearly developed, when data is read or overwritten.

The test method of the magnetic disk or the magnetic head is carried out using a test system shown in FIGS. 1 and 2. The following embodiment will be addressed to an overwrite test shown in FIGS. 6A and 6B. In FIGS. 6A and 6B, the arc-shaped tracks are developed linearly and the tracing tracks are schematically shown, similar to FIGS. 4A and 4B. Note that the sector numbers 1 through N are shown. In the illustrated embodiment, all the operations including the operation of the spinstand 11 are controlled by the personal computer 16.

Before the test is carried out, the actuator 119 is driven to move the magnetic head 121 attached to the front end of the-fixture 115 to a target track-which is pre-formatted on the magnetic hard disk 111. The magnetic disk 111 rotates constantly at a predetermined number of revolutions. In this state, a signal is written on or read out from at least one track of the magnetic disk 111 by the magnetic head 121.

<Moving Step>

In the moving step, the magnetic head 121 moves to a predetermined target track of the magnetic disk 111.

<Erasing Step>

In the erasing step, data is erased only for sectors having a specified band area centered at the target track position. This requires head movement around the target position.

<Writing Step>

In the data writing step, a predetermined signal is written in the data area of each sector of the magnetic disk 111 by the magnetic head 121. Namely, the position data imbedded in the data surface is read for each sector, and the read data is stored in the PS memory 26, are transferred to the personal computer 16 and are written in the data area of the sector (FIG. 6A). The profile of the signal writing area of the magnetic disk 111 in which a predetermined signal has been written in the writing step is indicated at LFW. The predetermined signal in the illustrated embodiment is a low-frequency signal LF which can be easily written but is difficult to erase.

Note that before the data writing step is performed, the erasing step is usually performed wherein data is erased only for sectors having a specified band area centered at the target track position.

After the writing of the data for one track is completed, the control proceeds to the first reading step.

<First Reading Step>

In the first reading step, the position data imbedded in the data surface is read out from each sector of the track by the magnetic head 121. When the read position data of the sector corresponding to the position data stored in the PS memory 26 are the same as each other or a difference therebetween is within an allowable range, the signal of the data area of the sector is read out and stored as sector data in the PS memory 26 and is transferred to and stored in the personal computer 16. These operations are repeated until the magnetic disk 111 rotates through a plurality of turns, e.g., several turns or several tens of turns. Thus completing the first reading step.

Namely, in the first reading step, the signal is read out from the data area of the sector and is stored only when the position of the magnetic head 121 is the same as the writing position. The data to be stored is data indicating the intensity of the signal.

The characteristics of the write head and the read head of the magnetic head 121 can be measured by analyzing the intensity of the sector data.

The above steps can be repeated until the predetermined number of sectors are read.

<Overwriting Step>

In the overwriting step, the position data imbedded in the data surface of each sector of the track is read by the magnetic head 121. The read position data and the stored position data corresponding to the sector data are compared. When both read position data and the stored position data are identical or a difference therebetween is within an allowable range, another signal is written in the data area of the sector. These operations are repeated until the magnetic disk 111 rotates by predetermined number of turns. Namely, even if the position of the magnetic head 121 is deviated at the first turn of the hard disk 111, the number of, the sectors to which the position of the magnetic head 121 is registered is increased by repeating the operations for several turns of the magnetic disk 111. In FIG. 6B, the movement path of the magnetic head 121 in the overwriting step is indicated at HFOW over the movement path of LFW which has been written in the writing step.

In an embodiment shown in FIG. 6B, it can be found that the position of the magnetic head 121 is the same as that in the first writing step at the three sector numbers 6, 7 and 8, and the data is overwritten.

Signals are read out from the data areas of the sector numbers 6 through 8 in which the data has been overwritten in the second reading step.

The another signal in the illustrated embodiment is a high-frequency signal LH.

<Second Reading Step>

In the second reading step, the position data imbedded in the data surface of each sector of the track by the overwriting is read out by the magnetic head 121. When a difference between the read position data and the stored position data corresponding to the sector data is within an allowable range, the signal of the data area of the sector is read out. The read signal is transferred to the personal computer 16 and stored therein. For each read operation of this second reading step, the residual LF component signal is extracted from the mixed data signal having an HF component. The average ratio of residual LF component versus original LF amplitude is calculated for each sector used.

The overwriting characteristics are analyzed based on the intensity of the stored signal.

In a test method according to the embodiment of the present invention, no tracking control of the magnetic head 121 is carried out and the read/write operations are carried out only when the magnetic head is located at a predetermined position in the radial direction. Therefore, the measurement can be effected at a high precision exceeding the precision of the magnetic disk and the precision of the tracking or positioning control of the magnetic head.

In the illustrated embodiment, the position data PS when the data is written or read out by the magnetic head 121 is stored, and subsequent reading or writing operations are carried out when the position of the magnetic head is the same as that at the writing operation or a difference in the position is within a predetermined range. In a modified embodiment, the position data when the reading or writing operation is performed is preset, so that the reading or writing operation can be carried out only for the sector from which the preset position data is obtained. In an alternative embodiment, it is not necessary to store the position data PS when the reading or writing operation is carried out. In this alternative, the writing operations are repeated while the magnetic disk 111 rotates several turns, so that the writing operations can be carried out for required number of sectors. Moreover, the writing operations can be carried out for a larger number of sectors by moving the magnetic head 121 in the radial direction by a predetermined unit displacement at each turn or more than one turn of the magnetic disk 111.

A smaller width track, used in a side erase test or a micro track profile test, can be formed using the test method of the present invention. An example thereof will be discussed below with reference to FIGS. 7A and 7B.

The data is written on one track, for example, by the writing operation in the overwrite test. Namely, the magnetic head 121 is moved to a predetermined radial position to write data onto all sectors while reading and storing the position data, or to write data onto sectors only when the head position is within the specified range of predetermined target position.

The moving path of the data track is indicated at LFW in FIG. 7A. In FIG. 7A, the data track is developed linearly in the vertical direction in the drawing, wherein the left half represents the outer periphery and the right half represents the inner periphery.

Thereafter, the side erasing process is carried out. Namely, assuming that the writing position of the data track is a reference position, plural target positions that are located on the outer circumference side of the reference position (left side in FIG. 7A) and plural target positions that are located on the inner circumference side of the reference position (right side in FIG. 7B) are set, and thereafter, the magnetic head 121 is moved to each of these positions. Consequently, the data of the data area of the sector of which the read position data is the same as a predetermined value or is within a predetermined range is erased.

In the illustrated embodiment, the erasing operation to erase the data of the data area of the sector is carried out only on the sector of which the position data read in the outermost position (a) in FIG. 7A is the same as a predetermined value or is within a predetermined range. Thereafter, a position (b) located more inwardly than the outermost position (a) is set and the magnetic head 121 is moved to the position (b). The erasing operation is carried out on the data area of the sector of which the position data read in the position (b) is the same as a predetermined value or is within a predetermined range.

Thereafter, the magnetic head 121 is moved to the innermost position (c) in FIG. 7A. The erasing operation to erase the data of the data area of the sector is carried out only on the sector of which the position data read in the innermost position (c) is the same as a predetermined value or is within a predetermined range. Thereafter, a position (d) located more outwardly than the innermost position (c) is set and the magnetic head 121 is moved to the position (d). The erasing operation is carried out for the data area of the sector of which the position data read in the position (d) is the same as a predetermined value or is within a predetermined range. The very narrow track LFWO is formed by repeating the erasing operations.

In the illustrated embodiment, the outer and inner circumference sides of the track profile LFW are erased in two steps, but the number of steps and the movement width in each step are not limited to those in the illustrated embodiment.

In the side erasing process, the outer and inner circumference sides of the track are erased, so that a track of narrow width can be correctly formed. The micro track profile for the narrow track LFWO in FIG. 7B is obtained by the same manner as the track profile test for the non-erased regular width track LFW, wherein the abscissa represents the radial direction and the ordinate represents the read signal amplitude. Also, the phantom line represents the track profile for non-erased regular width track LFW.

The test method of the present invention can be applied to an overwrite test, a micro track profile test or formation of a narrow width track. Any of the writing step, the first reading step, the overwriting step, and the second reading step can be combined with the moving step of the magnetic head in the radial direction at a predetermined amount.

Alternatively, the test method can include a reading step which carries out data error detection when the read position of a sector is either equal to the stored position. data at the writing step or a difference therebetween is within an allowable range. The reading step is performed for all or selected sectors while imbedded position data for the corresponding sectors are read out and stored. The reading step is performed for at least one rotation of the magnetic disk, and is followed by a data error calculation process using the stored position data for valid sector selection or bathtub curve measurement.

Although the above discussion has been addressed to the test method of one magnetic head, it is possible to apply the present invention to the head stack assembly having a plurality of magnetic heads. In this case, plural magnetic hard disks are provided. The test method mentioned above is carried out for each of the data recording surfaces of the hard disks and the magnetic heads. Also, although the magnetic head being tested is the magnetic head 121 in the illustrated embodiment, the magnetic head can be replaced with a reference magnetic head to apply the test method to a magnetic hard disk.

As can be understood from the above discussion, according to the present invention, in a test method of a magnetic hard disk or a magnetic head, when the position data read out from the magnetic disk by the magnetic head is the same as a predetermined value or is within a predetermined range, a predetermined signal is written in the data area of the sector or a signal is read out from the data area of the sector, and hence, the data reading or writing operation can be carried out at high precision exceeding the mechanical positioning precision of the magnetic head or the mechanical or physical precision of the magnetic disk. Thus, a high precision measurement exceeding the mechanical precision of the tester can be carried out.

Obvious changes may be made in the specific embodiments of the present invention described herein, such modifications being within the spirit and scope. of the invention claimed. It is indicated that all matter contained herein is illustrative and does not limit the scope of the present invention.

What is claimed is:

1. A testing method for a magnetic hard disk or a magnetic head in a test system comprising:
   a moving step in which the magnetic head moves to fly closely over the magnetic disk to a predetermined radial position corresponding to a position data of the magnetic disk which rotates at a predetermined constant speed;
   a writing step wherein for each sector of at least one track, imbedded position data is read out, a predetermined signal is written in a data area of the sector immediately thereafter, and the read position data is stored, said writing step being performed for at least one rotation of said magnetic disk;
   a first reading step in which the imbedded position data is read out from each sector of said track by the magnetic head and data of the data area of the sector is read out and stored, when a difference between the read position data and the stored position data corresponding to the sector data is within an allowable range, the data reading and storing operations being performed for at least one rotation of the magnetic disk;
   a data overwriting step in which the imbedded position data is read out from each sector of the track by the magnetic head and another signal is written in the data area of the sector, when a difference between the read position data and the stored position data corresponding to the sector data is within an allowable range, the data reading and writing operations being performed for at least one rotation of the magnetic disk; and
   a second reading step in which the overwritten position data is read out from each sector of the track by the magnetic head and the data of the data area of the sector is read out, when a difference between the read position data and the stored position data corresponding to the sector data is within an allowable range.

2. The testing method for a magnetic hard disk or a magnetic head according to claim 1, further comprising:

an erasing step which is performed between the moving step and the writing step, wherein a data area is erased only for each sector having a specified band area centered at the target track position.

3. The testing method for a magnetic hard disk or a magnetic head according to claim 1, wherein said predetermined signal is written at a low frequency during the data writing step and said another signal is overwritten at a high frequency during the overwriting step.

* * * * *